United States Patent [19]

Atsukawa et al.

[11] 4,009,244
[45] Feb. 22, 1977

[54] PROCESS FOR REMOVING OXIDES OF NITROGEN AND SULFUR FROM EXHAUST GASES

[75] Inventors: Masumi Atsukawa; Naoharu Shinoda; Kenji Inoue, all of Hiroshima, Japan

[73] Assignee: Mitsubishi Jukogyo Kabushiki Kaisha, Tokyo, Japan

[22] Filed: Apr. 3, 1975

[21] Appl. No.: 564,749

[30] Foreign Application Priority Data

Apr. 19, 1974 Japan .................... 49-44156

[52] U.S. Cl. ................ 423/235; 423/239; 423/242; 423/555; 423/212

[51] Int. Cl.$^2$ .................... C01B 21/00

[58] Field of Search .......... 423/235, 239, 242, 166, 423/512 A, 385, 395, 178, 162, 351, 497, 499, 212 R, 212 C

[56] References Cited

UNITED STATES PATENTS

| 2,242,217 | 5/1941 | Amenabar | 75/115 |
|---|---|---|---|
| 3,499,723 | 3/1970 | Hamilton et al. | 423/235 |
| 3,556,722 | 1/1971 | Owaki et al. | 423/242 |
| 3,652,227 | 3/1972 | Harman et al. | 423/239 |
| 3,733,393 | 5/1973 | Couillaud et al. | 423/235 |
| 3,773,897 | 11/1973 | Fields et al. | 423/235 |
| 3,888,968 | 6/1975 | Atsukawa et al. | 423/242 |

FOREIGN PATENTS OR APPLICATIONS 1,467,124 1969 Germany ................ 423/235

OTHER PUBLICATIONS

Chemical Abstracts–1957–15226a.

*Primary Examiner*—Oscar R. Vertiz
*Assistant Examiner*—Eugene T. Wheelock
*Attorney, Agent, or Firm*—Cushman, Darby & Cushman

[57] ABSTRACT

The present invention relates to a process for wet-treating an exhaust gas which comprises simultaneously removing a nitrogen oxide ($NO_x$) and a sulfur oxide ($SO_x$) from an exhaust gas containing these oxides by treating exhaust gas containing oxides of nitrogen and sulfur with a lime or limestone slurry containing alkali metal or alkaline earth metal iodide.

5 Claims, 1 Drawing Figure

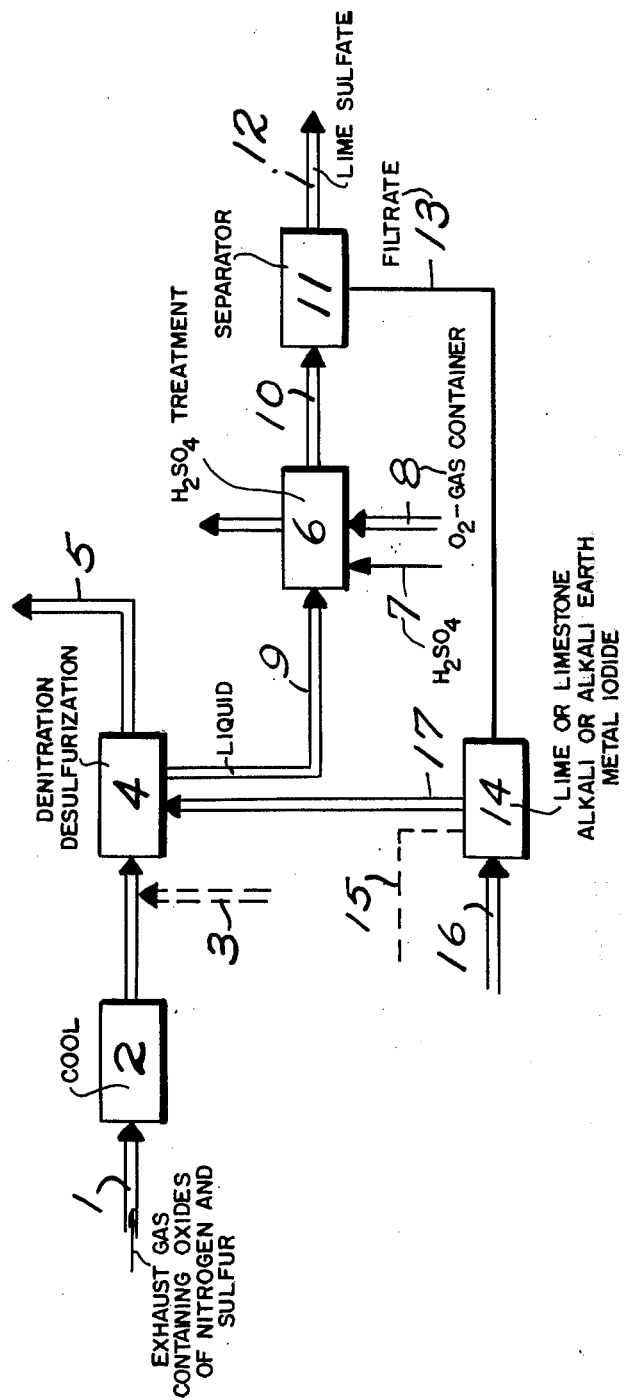

PROCESS FOR REMOVING OXIDES OF NITROGEN AND SULFUR FROM EXHAUST GASES

BACKGROUND OF THE INVENTION

Combustion exhaust gas exhausted from a boiler, an internal combustion engine, etc. contain a nitrogen oxide and a sulfur oxide that are sources of air pollution.

Art recognized processes for removing nitrogen oxide from exhaust gases include the methods of (1) oxidizing nitrogen monoxide to nitrogen dioxide and thereafter washing said nitrogen dioxide with an aqueous alkali solution, (2) dissolving such nitrogen oxide in a nitrogen gas by contact reduction of nitrogen monoxide, and (3) causing nitrogen monoxide to be absorbed and adsorbed into a solid.

However, all of these methods (1) – (3) are directed to treatment of an exhaust gas containing a high concentration $NO_x$; and it has been difficult to efficiently remove a low concentration $NO_x$ from an exhaust gas containing the same.

An effective method for removing sulfur oxide from exhaust gases is a method of wet-desulfurizing an exhaust smoke; a technology of concurrently removing a mixture of a sulfur oxide and a nitrogen oxide as well utilizing said method is under development; however, the efficiency of that process is still very low.

BRIEF DESCRIPTION OF THE DRAWING:

The drawing is a flow sheet of a process for wet-treating an exhaust gas in accordance with one embodiment of the present invention.

SUMMARY OF THE INVENTION

The present invention provides a process for wet-treating an exhaust gas capable of efficiently and simultaneously removing a nitrogen oxide and a sulfur oxide from an exhaust gas containing these oxides.

DETAILED DESCRIPTION OF THE INVENTION

A process for wet-treating an exhaust gas according to the present invention may be undertaken in accordance with the following three embodiments.

I. Washing an exhaust gas containing a nitrogen oxide and a sulfur oxide with a lime or limestone slurry containing an alkali metal or alkaline earth metal iodide;

II. Oxidizing a nitrogen oxide of an exhaust gas containing the nitrogen oxide and a sulfur oxide in advance, thereafter, washing said exhaust gas with a lime or limestone slurry containing an alkali metal or alkaline earth metal iodide: and III. Extracting the lime or limestone slurry used for washing in the process of I, above, separating a solid from a liquid and circulating and supplying the separated liquid containing the alkali metal or alkaline earth metal iodide again in a step of washing the exhaust gas.

Lime or limestone are necessary for preparing an absorbent used in the present invention; hence the cost of the project is low and a high-purity gypsum is obtained as a by-product. Denitration and desulfurization are carried out simultaneously at a high efficiency and a nitrogen oxide becomes a harmless nitrogen gas and a sulfur oxide becomes gypsum.

Accordingly, the process of the present invention is not only remarkably economical, but also very advantageous from the viewpoint of preventing environmental pollution.

Hereinbelow, the present invention will be explained in more detail with reference to the attached drawings.

The process for wet-treating an exhaust gas according to the present invention includes the three steps of an exhaust gas washing step, an oxidizing step and an after-treating step.

(1) The exhaust gas washing step

A step of introducing an exhaust gas processed through a pre-treating step into a gas washing apparatus and using a lime or limestone slurry to cause sulfur oxide to be absorbed; at the same time, accelerating absorption of the nitrogen oxide by a very small amount of an alkali metal or alkaline earth metal iodide.

When this step is explained by reaction formulae, the sulfur oxide in the exhaust gas reacts with slaked lime or calcium carbonate in the slurry to produce lime sulfite in the following formula (1), a part of the produced lime sulfite further reacts with oxygen to become lime sulfate in the following formula (2).

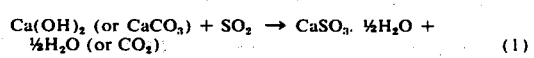

$$Ca(OH)_2 \text{ (or } CaCO_3) + SO_2 \rightarrow CaSO_3 \cdot \tfrac{1}{2}H_2O + \tfrac{1}{2}H_2O \text{ (or } CO_2) \tag{1}$$

$$CaSO_3 \cdot \tfrac{1}{2}H_2O + \tfrac{1}{2}O_2 + Aq \rightarrow CaSO_4 \cdot 2H_2O \tag{2}$$

The produced lime sulfite absorbes the nitrogen oxide by reactions of the following formulae (3) and (4).

$$CaSO_3 \cdot \tfrac{1}{2}H_2O + NO_2 + Aq \rightarrow CaSO_4 \cdot 2H_2O + N_2 \tag{3}$$

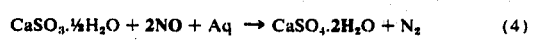

$$CaSO_3 \cdot \tfrac{1}{2}H_2O + 2NO + Aq \rightarrow CaSO_4 \cdot 2H_2O + N_2 \tag{4}$$

This absorption reaction of the nitrogen oxide becomes very fast in reaction rate when a very small amount, for example, about 1000 ppm of an alkali metal or alkaline earth metal iodide exists in the lime slurry. In other words, these iodides exhibit catalytic actions.

It is desirable that an exhaust gas to be introduced into the exhaust gas washing step be subjected to the following pretreatments in the prior stage.

One is pre-cooling step and the other is a pre-oxidizing step. In the former, the exhaust gas is cooled and humidified using, for example, a spray-type cooling apparatus. It is necessary to cool the exhaust gas to a temperature less than 90° C.

Among nitrogen oxides in the exhaust gas, nitrogen monoxide (NO) is more unlikely to be absorbed by the lime slurry than nitrogen dioxide. Therefore, a method of oxidizing nitrogen monoxide to nitrogen dioxide using a suitable oxidizing agent is conceivable.

The pre-oxidizing step is a step of adding said oxidizing agent into the exhaust gas. As such oxidizing agent, ozone, hydrogen peroxide, nitric acid, etc. can be employed, of which ozone is most preferable. Oxidation of nitrogen monoxide to nitrogen dioxide by ozone is very fast; and the reaction is complete within about a moment. Because of the speed of the reaction between ozone and the nitrogen oxides, the sulfur oxide component of the admixture is hardly oxidized; the amount of ozone which is added is about the same as the amount of nitrogen monoxide will suffice.

When the exhaust gas is processed in accordance with the aforementioned pre-treating steps, the result of the entire process is that denitration and desulfurization are maximized, as compared to the effect of the process when the aforementioned pre-treating steps are not employed.

2. The oxidizing step

The slurry forwarded from the aforesaid exhaust gas washing step contains, besides water, lime sulfite, lime sulfate, excess lime (or limestone), and a very small amount of an alkali metal or alkaline earth metal iodide.

The oxidizing step is a step of oxidizing lime sulfite of the aforesaid components to lime sulfate by an oxygen-containing gas.

At first, by adding sulfuric acid, the excess lime is converted to lime sulfate and the pH of a liquid is controlled to below 6, preferably 4.5–3.

This reaction, when shown by a formula, becomes as the following formula (5).

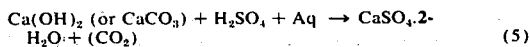

$$Ca(OH)_2 \text{ (or } CaCO_3) + H_2SO_4 + Aq \rightarrow CaSO_4 \cdot 2H_2O + (CO_2) \tag{5}$$

The liquid when its pH is controlled to below 6 becomes lime sulfate by an oxidizing apparatus due to reaction of the following formula (6).

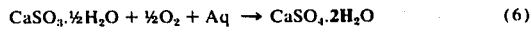

$$CaSO_3 \cdot \tfrac{1}{2}H_2O + \tfrac{1}{2}O_2 + Aq \rightarrow CaSO_4 \cdot 2H_2O \tag{6}$$

The reaction of the formula (6) is generally slow. Therefore, it is necessary to adopt as the oxidizing apparatus, an apparatus of a form by which, upon supplying air or oxygen, it becomes fine bubbles so as to be able to well contact the liquid and to accelerate the reaction of the formula (6).

3. The after-treating step

The components of the slurry forwarded from the aforesaid oxidizing step are water, lime sulfate and a very small amount of an alkali metal or alkaline earth metal iodide.

The after-treating step is a step of removing a solid component such as lime sulfate from the aforesaid slurry and returning a separated liquid containing a very small amount of an iodide to the aforesaid exhaust gas washing step. Into this step, the slurry of the exhaust gas washing step may be directly introduced by omitting the oxidizing step therebetween.

Separation of the solid from the liquid is normally carried out using a centrifuge or other filtering machines. The very small amount of the iodide dissolving completely in water, said iodide remains in the liquid phase after filtration and when this iodide is returned to the aforementioned exhaust gas washing step, it contributes to absorption of the nitrogen oxide. As such, it being possible to circulate and use the iodide, supply of the iodide becomes hardly necessary.

The process of the present invention will be explained by referring to the accompanying drawing, reference numeral 1 denotes an exhaust gas coming out from a combustion apparatus, which is supplied to a humidifying and cooling apparatus 2, where the exhaust gas is humidified and cooled and when the accompanying dust is removed, the exhaust gas is supplied to an exhaust gas washing apparatus 4, where denitration and desulfurization of the exhaust gas are simultaneously carried out in accordance with the aforementioned reaction formulae. The exhaust gas thus freed of a nitrogen oxide and a sulfur oxide is diffused in the air as a clean gas from a chimney.

An absorbent, namely, a lime or limestone slurry is prepared in a lime slurry preparing apparatus 14 using material lime or limestone and a liquid 13 forward from a separating apparatus 11 to be mentioned later. At that time, it is necessary to add a small amount of an alkali metal or alkaline earth metal iodide to the lime slurry preparing apparatus 14.

The so prepared lime or limestone slurry is supplied to the exhaust gas washing apparatus 4.

A liquid 9 forwarded from the exhaust gas washing apparatus 4 is supplied to an oxidizing apparatus 6, where excess lime component (lime, limestone) is converted to lime sulfate by addition of sulfuric acid 7, at the same time, the pH of the liquid is controlled to below 6. Incidentally, all the lime sulfite is oxidized to lime sulfate by an oxygen-containing gas 8.

A lime sulfate slurry 10 coming out from the oxidizing apparatus 6 is supplied to a separating apparatus 11, where it is separated to solid crystal lime sulfate 12 and a filtrate 13. The former is a high-purity gypsum. The latter containing an alkali metal or alkaline earth metal iodide, is supplied to the exhaust gas washing apparatus 4 via the lime slurry preparing apparatus 14 and used repeatedly.

Upon practicing the process of the present invention, the process need not be limited to the illustrated flow sheet.

It is possible to directly send the slurry of the exhaust gas washing apparatus 4 to the separating apparatus 11 without processing through the oxidizing apparatus 6, and it is possible to directly send a part of the liquid 13 of the separating apparatus 11 to the exhaust gas washing apparatus 4 without processing through the lime slurry preparing apparatus 14 as well.

EXAMPLE 1

200 Nm³/h of an exhaust gas containing 176 ppm of $NO_2$, 1150 ppm of $SO_2$, 4.5% of $O_2$, 9% of $CO_2$ and the balance of $N_2$ and water at 180° C was made a gas to be treated.

As treating apparatuses, a 0.2 m$\phi$ × 2 m high grid-filled gas washing apparatus and an oxidizing apparatus equipped with a 0.15 m$\phi$ 2-liter rotary air dispersing machine were used. An absorbent was 5% by weight of a lime slurry added with 2000 ppm of KI.

The aforesaid lime slurry was supplied to the gas washing apparatus in such a manner that the pH of the absorbent slurry inside the gas washing apparatus might become about 5.2, at the same time, in order that the amount of a liquid inside said apparatus might become constant, the slurry was properly extracted and a part of the slurry was made a sample of the oxidation test in the oxidizing apparatus.

The liquid temperature of the oxidizing apparatus was kept at 60° C, the air was made into fine bubbles by the rotary air dispersing machine and supplied, while the oxidizing time was made about 60 minutes. At that time, the pH of the liquid was kept at 4 by adding a small amount of sulfuric acid.

The experimental results were shown below. At first, the exhaust gas of the gas washing apparatus was at about 55° C in temperature, containing 45 ppm of $NO_2$ and 120 ppm of $SO_2$.

When the oxidized slurry was taken out from the oxidizing apparatus and filtered, gypsum whose purity was more than 99.5% was obtained.

On the other hand, when the quantitative analysis of a nitrogen compound in the solution was carried out according to an entire nitrogen analyzing method (defined in Japanese Industrial Standard), a value of 0.55 m mol/liter was obtained, which correspond to below 1/10 of the absorbed $NO_2$ inferred from the balance of substances.

The amount of KI was about 2000 ppm and free $I_2$ was not detected.

EXAMPLE 2

In Example 1, the lime slurry not added with KI was supplied to the same gas washing apparatus, as a result, the exhaust gas at the exit was at about 55° C in temperature, containing 155 ppm of $NO_2$ and 125 ppm of $SO_2$.

What is claimed is:

1. A process for removing oxides of nitrogen and of sulfur from exhaust gases, comprising washing exhaust gases containing the oxides of nitrogen and of sulfur with a slurry of lime or limestone, which slurry contains a alkali metal iodide or an alkaline earth metal iodide to convert the nitrogen oxide to nitrogen gas and the sulfur oxide to gypsum.

2. The process of claim 1, which consists essentially of oxidizing the nitrogen oxide to $NO_2$ in the exhaust gas which contains the oxides of nitrogen and of sulfur, prior to undertaking said step of washing.

3. The process of claim 1, which includes the further step of extracting the slurry after undertaking said step of washing to separate solid material from the liquid, and recycling the separated liquid which contains said iodide to form a part of the slurry of said washing step.

4. The process of claim 1, wherein said exhaust gas is cooled to below 90° C, prior to undertaking said washing step.

5. The process of claim 1, wherein the exhaust gas comprises oxygen, carbon dioxide and nitrogen.

* * * * *